United States Patent [19]

Stradella

[11] Patent Number: 4,762,145

[45] Date of Patent: Aug. 9, 1988

[54] UNDERWATER PRESSURE RELIEF VALVE

[75] Inventor: Fabio Stradella, Genoa, Italy

[73] Assignee: G.S.D. Sports Equipment S.R.L., Italy

[21] Appl. No.: 49,813

[22] Filed: May 13, 1987

[51] Int. Cl.⁴ ............................................. F16K 17/06
[52] U.S. Cl. .................................. 137/599.2; 114/315; 137/530; 137/540; 137/614.2; 441/96
[58] Field of Search ................ 114/315; 137/540, 530, 137/599.2, 614.2; 441/96

[56] References Cited

U.S. PATENT DOCUMENTS 2,404,020  7/1946  Akerman ..................... 137/530 X
3,217,736  11/1965  Voss ............................. 137/530 X

FOREIGN PATENT DOCUMENTS 2423289  11/1975  Fed. Rep. of Germany ........ 441/96

Primary Examiner—Gerald A. Michalsky
Attorney, Agent, or Firm—Jacobs & Jacobs

[57] ABSTRACT

Relief valve facilitating the underwater balancing of scuba divers' inflatable articles, which is finely adjustable and extremely responsive, and is designed to ensure a high functionality by using simplified components to minimize the manufacturing costs.

4 Claims, 1 Drawing Sheet

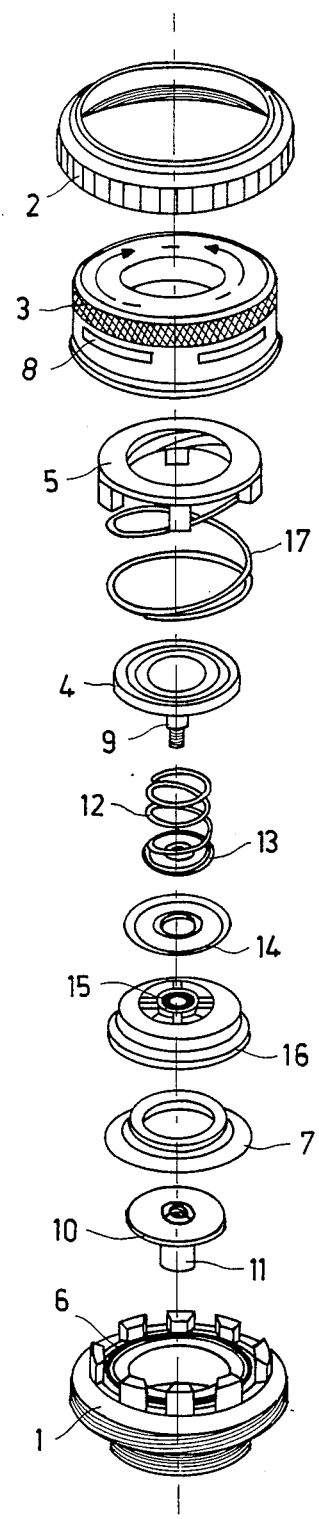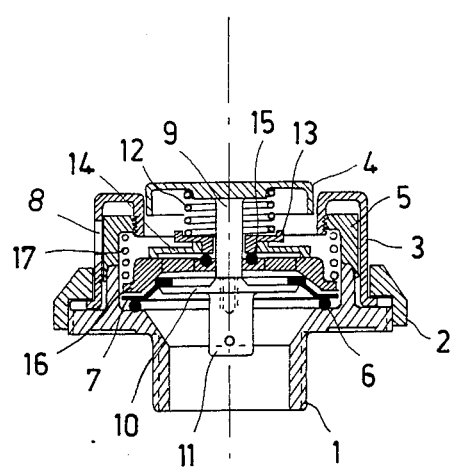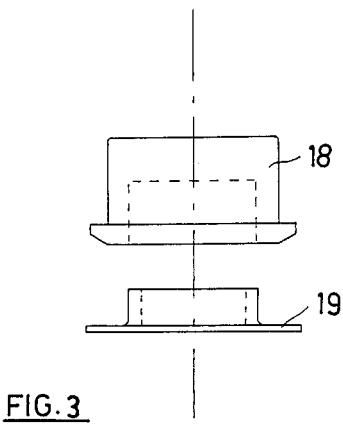
FIG.1
FIG.2
FIG.3

UNDERWATER PRESSURE RELIEF VALVE

SUMMARY

This invention relates to an adjustable relief valve for underwater inflatable articles, such as some types of diving suits and, more particularly, balancing jackets integrated with the bottles and to be worn as a normal jacket, said articles being presently widely used by scuba-divers. As a result of this wide use, many suggestions have been set forth which have been advantageously taken into consideration to provide an improved adjustable relief valve meeting all present requirements. The object of this invention is to provide such an improved valve which has several advantages resulting from various technical characteristics, to be defined in this patent specification. Specifically, the invention aims to ensure the utmost functionality by using relatively simple components which, additionally, minimize the maintenance requirements.

BRIEF DESCRIPTION OF THE DRAWINGS

The valve of the invention is shown by way of a non-limiting example in the accompanying drawing, wherein:

FIG. 1 is an axial sectional view of the valve, complete with adjustment bushing and with quick-relief pushbutton;

FIG. 2 is an exploded perspective view of said valve; and

FIG. 3 is a front view of a cap with rubber seal, adapted to be substituted for the components of the quick-relief pushbutton, which simplifies a valve in case the quick-relief effect is not required.

DESCRIPTION OF THE PREFERRED EMBODIMENT

As can be appreciated from the Figures, the valve comprises a circular union-like base member 1 having a bottom threaded hub adapted to receive a threaded locking ring once said hub has been introduced into a suitable hole in the material constituting said inflatable article. Said base member includes an externally threaded flange for screwing thereon a threaded ring 2 to lock thereon a cylindrical body member 3 enclosing all the internal parts of the valve. Said cylindrical body member 3 is formed with a bottom shoulder rim to be engaged by said ring 2, and with a top through-hole for accommodating a pushbutton 4, said hole comprising an inside circular guide skirt which has an outer left-hand threading for securing thereon a ring member 5 formed with a plurality of peripheral teeth adapted to mesh with a similar circumference of teeth formed on said base member 1, said base member comprising centrally a seat for accommodating a sealing ring 6 co-operating with a thin, flexible, flange-like seal acting as well as a non-return membrane for the water. Said cylindrical body member 3 is formed, additionally, with a plurality of peripheral vent slots 8, while said pushbutton 4, axially slidable in the central hole of said body member 3, comprises an inside central stem 9 having a threaded lower end intended to be screwed into a disc-like member 10 provided with a depending hub 11, so that the movable valve assembly is held together. This assembly also comprises a coil spring 12 with a supporting washer 13 which is slidable on said stem 9, a very flexible disc-like valve member 14 acting as a non-return means for the water, a sealing ring 15 and a slotted centering and supporting disc 16. This disc is urged downwards by a coil spring 17 urging at the top thereof against said ring member 5 which is screwed with its left-hand threading on the annular skirt of said body member 3; therefore, the load of said spring may be adjusted by rotating said body member 3 which, for this purpose, is provided with a peripheral knurling. By means of this operation, therefore, the level of response of the valve may be adjusted, the sensitivity of the valve being very high since the attendant sealing components are made of rubber and are very thin and flexible. The valve, therefore, as required in this specific use, responds with great precision even to minimum pressure differentials, and enables a perfect balancing in any diving attitude and an absolute tightness owing to the non-return features of the components 7 and 14.

The above description relates to the normal version of the relief valve, i.e. the version comprising a quick-relief pushbutton. If this function is not required, the movable assembly comprising the parts 4-7-9-10-11-12-13-14-15-16 may be replaced with the parts shown in FIG. 3, namely a cap 18 with respective disc-like membrane 19 having as well a non-return function.

Changes and modifications may be made to the invention as described and shown herein without departing from the basic principles of the invention.

I claim:

1. A pressure relief valve for underwater inflated articles, comprising:
   (A) a base member including a hollow cylindrical portion extending longitudinally along an axis and being in communication with an underwater inflated article having an internal pressure to be relieved, and an annular flange extending in a radially outward direction;
   (B) a body member mounted for turning movement on the flange and having a central axially-extending guide passage;
   (C) a locking ring mounted for turning movement on the flange between a locked position in which the body member is clamped to the base member, and an unlocked position in which the body member is free to turn about the axis;
   (D) a manually-operated pressure relief assembly, including
      (i) a pushbutton extending axially outwardly at least in part of the body member in an unactuated position, and being manually displaceable axially along the guide passage to an actuated position,
      (ii) an axially-extending stem movable with the pushbutton,
      (iii) a sealing disc mounted on the stem for joint movement therewith,
      (iv) a support washer having a central hole through which the stem passes with clearance, and
      (v) an elongated first coil spring centered on the axis and having one end bearing against the pushbutton, and an opposite end bearing against the support washer, said first spring being tensioned to constantly urge the support washer and the pushbutton in opposite axial directions;
   (E) a valve support member having a central portion sealingly engaging the support washer, an outer annular rim extending in a radially outward direction, an outer valve surface facing toward the pushbutton, and an inner valve surface facing away from the pushbutton;

(F) a first flexible diaphragm mounted between the support washer and the valve support member and sealingly engaging the outer valve surface in the unactuated position of the pushbutton;

(G) a second flexible diaphragm mounted between the sealing disc and the valve support member and sealingly engaging the inner valve surface in the unactuated position of the pushbutton; and (H) an automatically-operated pressure relief assembly independently operative of the manually-operated assembly, including (i) an adjustable cylindrical sleeve mounted on the body member for turning movement about the axis when the body member is turned, said sleeve having a radially-extending shoulder, and (ii) an elongated second coil spring centered on the axis and having one end bearing against the shoulder, and an opposite end bearing against the outer annular rim of the valve support member for urging the second flexible diaphragm mounted on the valve support member into sealing engagement with the annular flange of the base member with an adjustable biasing force which is dependent on the angular extent through which the sleeve has been turned by the body member.

2. The valve as recited in claim 1, wherein the base member has a first set of axially-extending projections arranged in an annulus about the axis, and wherein the sleeve has a second set of axially-extending projections arranged in an annulus about the axis and engaging the first set.

3. The valve as recited in claim 1, wherein the first spring has coils of a predetermined diameter, and wherein the second spring has coils of a diameter larger than said predetermined diameter.

4. The valve as recited in claim 1, wherein the body member has vent holes.

* * * * *